(12) United States Patent
Span et al.

(10) Patent No.: US 11,731,685 B2
(45) Date of Patent: Aug. 22, 2023

(54) STEERING GEAR OF A VEHICLE STEERING SYSTEM

(71) Applicant: ZF Automotive Germany GmbH, Alfdorf (DE)

(72) Inventors: Eduard Span, Cologne (DE); Timm Leuerer, Düsseldorf (DE); Rolf von Laar, Niederkrüchten (DE); Sridharan Krishnan, Neuss (DE); Robert Kolloch, Mönchengladbach (DE)

(73) Assignee: ZF Automotive Germany GmbH, Alfdorf (DE)

( * ) Notice: Subject to any disclaimer, the term of this patent is extended or adjusted under 35 U.S.C. 154(b) by 41 days.

(21) Appl. No.: 16/951,229

(22) Filed: Nov. 18, 2020

(65) Prior Publication Data
US 2021/0146989 A1 May 20, 2021

(30) Foreign Application Priority Data

Nov. 19, 2019 (DE) .......................... 102019131246.9

(51) Int. Cl.
*B62D 3/12* (2006.01)
*F16H 19/04* (2006.01)

(52) U.S. Cl.
CPC .............. *B62D 3/126* (2013.01); *B62D 3/123* (2013.01); *F16H 2019/046* (2013.01)

(58) Field of Classification Search
CPC .......... B62D 3/12; B62D 3/123; B62D 3/126; F16H 19/04; F16H 2019/046
See application file for complete search history.

(56) References Cited

U.S. PATENT DOCUMENTS

| 5,694,810 | A | * | 12/1997 | Iwasa | ........................ | B62D 5/12 |
| | | | | | | 74/498 |
| 8,641,316 | B2 | * | 2/2014 | Betke | ........................ | B62D 3/12 |
| | | | | | | 403/368 |
| 9,651,134 | B2 | * | 5/2017 | Taoka | ........................ | B62D 3/12 |
| 10,011,295 | B2 | * | 7/2018 | Ohashi | ..................... | F16F 15/08 |
| 10,118,640 | B2 | * | 11/2018 | Ogata | ........................ | F16F 3/10 |
| 10,279,835 | B2 | * | 5/2019 | Kawakubo | ............ | F16H 55/283 |
| 10,689,023 | B2 | * | 6/2020 | Span | ..................... | B62D 3/126 |

(Continued)

FOREIGN PATENT DOCUMENTS

DE 102014113666 A1 3/2016
JP H0576950 U * 10/1993

(Continued)

OTHER PUBLICATIONS

Machine translation of JP 2005-41251 A obtained on Sep. 13, 2022.*

*Primary Examiner* — Adam D Rogers
(74) *Attorney, Agent, or Firm* — Robert James Harwood

(57) ABSTRACT

A rack-and-pinion gear is described, which is suitable in particular for a steering system of a motor vehicle. In this a pinion is supported in a pinion housing and meshes with a rack inside this pinion housing. The rack here projects from the pinion housing through at least one housing aperture. A stop ring, which serves to limit a rack longitudinal movement and/or a tilting of the rack, is moreover held in the housing aperture by means of a press fit. In addition, a steering gear having such a rack-and-pinion gear and a steering system for a motor vehicle comprising such a steering gear are described.

17 Claims, 2 Drawing Sheets

(56) References Cited

U.S. PATENT DOCUMENTS

| | | | | |
|---|---|---|---|---|
| 11,465,667 B2 * | 10/2022 | Ishii | ............ | B62D 3/12 |
| 2015/0158520 A1 * | 6/2015 | Watanabe | ............ | B62D 3/126 |
| | | | | 280/93.514 |
| 2021/0171096 A1 * | 6/2021 | Span | ............ | F16C 17/04 |
| 2022/0194461 A1 * | 6/2022 | Ikeyama | ............ | B62D 3/123 |

FOREIGN PATENT DOCUMENTS

| | | | | | |
|---|---|---|---|---|---|
| JP | 2000168579 A | * | 6/2000 | | |
| JP | 2005041251 A | * | 2/2005 | | |
| JP | 2013035481 A | * | 2/2013 | | |
| JP | 2018079724 A | * | 5/2018 | | |
| KR | 20020053247 A | * | 7/2002 | | |
| KR | 20080058649 A | * | 6/2008 | | |
| KR | 20170106580 A | * | 9/2017 | | |
| WO | WO-03026945 A2 | * | 4/2003 | ............ | B62D 5/22 |
| WO | WO-2015124466 A1 | * | 8/2015 | ............ | B62D 3/12 |
| WO | WO-2018139569 A1 | * | 8/2018 | ............ | B62D 3/12 |
| WO | WO-2020202775 A1 | * | 10/2020 | | |

* cited by examiner

STEERING GEAR OF A VEHICLE STEERING SYSTEM

CROSS-REFERENCE TO RELATED APPLICATION

This application claims priority to German Patent Application No. 102019131246.9 filed Nov. 19, 2019, the disclosure of which is incorporated herein by reference in its entirety.

TECHNICAL FIELD

The present disclosure relates to a rack-and-pinion gear, particularly for a steering system of a motor vehicle, having a rack and a pinion, wherein the pinion is supported in a pinion housing and meshes with the rack inside the pinion housing and wherein the rack projects from the pinion housing through at least one housing aperture.

The present disclosure moreover relates to a steering gear having such a rack-and-pinion gear.

In addition, the present disclosure relates to a steering system for a motor vehicle which comprises such a steering gear.

BACKGROUND

Rack-and-pinion gears per se, and their use in steering gears, are disclosed by the prior art. The same applies to steering systems for motor vehicles which utilize steering gear with rack-and-pinion gears.

Rack-and-pinion gears, particularly in the automotive industry, are always subject to a conflict of aims between a simple, cost-effective production and high operating reliability. This is particularly important where a rack-and-pinion gear is used in a steering gear or a steering system, since steering gear and steering systems are safety-relevant sub-assemblies of a motor vehicle, so that here simplifications and cost savings in production may be made only if a high degree of reliability is maintained.

SUMMARY

The object of the present disclosure, therefore, is to specify a rack-and-pinion gear which has a high operating reliability and which can be produced cost-effectively. The intention is thereby also to create steering gear and steering systems which likewise have a high reliability and are cost-effective to produce.

The object is achieved by a rack-and-pinion gear of the aforementioned type in which a stop ring, which is held in the pinion housing by means of a press fit, is provided in the housing aperture for limiting a rack longitudinal movement and/or a tilting of the rack.

A rack longitudinal movement is here taken to mean that movement of a rack which results from its being driven by a pinion. If the rack-and-pinion gear is an integral part of a steering system, the rack performs such a rack longitudinal movement as a result of turning the steering wheel. In order to ensure that the rack meshes with the pinion under all circumstances, this rack longitudinal movement must be limited by a stop. This is also referred to as a limit stop.

A tilting of the rack or distortion of the rack denotes a twisting of the rack relative to the direction of the rack longitudinal movement. An associated center of rotation here may lie in the area of engagement between rack and pinion. A tilting of the rack must also be limited in order to ensure that the pinion remains in engagement with the rack at all times.

The aforementioned limiting of the rack longitudinal movement and the tilting of the rack must at the same time also be ensured in those instances in which a device, serving in normal operation to impart a force to the rack in the direction of the pinion, has become defective or been lost. Such a device is also referred to as a yoke.

A rack-and-pinion gear according to the present disclosure affords all the aforementioned functions. At the same time the stop ring is very easy to fit. It merely has to be pressed into the pinion housing. Here no additional assembly elements of any kind, for example in the form of screws, clips or adhesive, are needed for the press fit. Consequently, assembly is easy and cost-effective. Furthermore, the press fit requires only extremely simple preparation, if any, of the assembly surfaces that form the press fit. Both the pinion housing, particularly in the area of the housing aperture, and the stop ring are therefore easy and cost-effective to produce. In particular, no working surfaces are needed here for the application of assembly tools or the like.

The stop ring may also serve as support for the rack, particularly if the latter is heavily curved. In this way it is ensured, that the pinion and the rack intermesh with one another, even under a heavy bending stress of the rack, and that the rack-and-pinion gear therefore functions reliably.

According to one embodiment an inner circumferential surface of the stop ring comprises a first stop face for limiting the tilting of the rack. Here the term "first" is only to be understood as a description of the stop face. A number of stop faces is thereby not implied. If the rack is tilted to a sufficient degree, it will therefore strike against an inner circumferential surface of the stop ring or a portion thereof. The tilting of the rack is thereby limited and engagement of the pinion in the rack is ensured. The rack-and-pinion gear therefore functions particularly reliably.

In addition or alternatively, a lateral face of the stop ring remote from the pinion may comprise a second stop face for limiting the rack longitudinal movement. Again, the term "second" is only to be understood as a description of the stop face. A number of stop faces is not implied. In connection with this, a counter-stop face may be provided on the rack which bears on the second stop face when the rack has reached the end of its longitudinal movement range. In this way too, a rack-and-pinion gear can be achieved which has a high operating reliability, since the pinion and the rack intermesh with one another at all times.

The stop ring is preferably produced from a plastic material, in particular from polyamide. The stop ring can therefore be produced by plastics manufacturing processes, giving rise to relatively low manufacturing costs. This applies in particular to a mass production of stop rings. For example, the stop ring can be produced by means of an injection molding process.

The plastic material may be a fiber-reinforced plastic material. The reinforcement fibers in this case are in particular glass fibers or carbon fibers.

For example, the stop ring is produced from the material PA 6.6 GF30.

In one variant the housing aperture is of substantially cylindrical formation and the press fit exists between an outer circumferential surface of the stop ring and a generated surface of the housing aperture. Here the housing aperture preferably takes the form of a circular cylinder. The outer circumferential surface of the stop ring then also has substantially the shape of a circular cylindrical shell. In this case the housing aperture and the stop ring may be of rotationally symmetrical design, so that when fitting the stop ring its rotational orientation is irrelevant. In this way a simple and cost-effective assembly is achieved.

The pinion housing may be produced by means of a casting process and be unmachined, particularly in the area of the press fit. Here the description of the pinion housing as "unmachined" refers to the state after casting, that is to say after casting of the pinion housing no further machining takes place in the area of the press fit. In particular, no machining is undertaken involving metal-cutting. The pinion housing therefore has a cast surface in the area of the press fit. The absence of otherwise usual finishing of the cast pinion housing leads to a saving in manufacturing costs. The fact that an unmachined housing aperture possibly only satisfies coarser tolerances than a machine-finished housing aperture, for example, is obvious. The press fit, which serves to hold the stop ring in the pinion housing, can nevertheless also be reliably achieved inside a housing aperture subject only to coarse tolerances.

The pinion housing is produced, for example, by means of an aluminum die-casting process.

According to one alternative the stop ring comprises a fully or partially circumferential fixing bead on its outer circumferential surface. Here a fixing bead is taken to mean a bead which serves to secure the stop ring in the pinion housing. It is intended here or at least accepted that this bead will be deformed when fitting the stop ring in the pinion housing. In this way the stop ring can even be reliably fitted by means of a press fit in pinion housings that are subject only to coarse tolerances. In this context a partially circumferential fixing bead is taken to mean, on the one hand, fixing beads which as continuous beads span only a part of the circumference of the stop ring. On the other hand, it is also taken to mean those fixing beads which in contrast to a fully circumferential fixing bead are interrupted multiple times on the circumference of the stop ring. In other words, a fixing bead made up of multiple fixing bead portions running around part of the circumference is also to be regarded as a partially circumferential fixing bead.

The pinion housing is in particular formed without a groove in the area of the press fit. That is to say no groove or recess is provided into which the fixing bead could engage on the housing side. The pinion housing is therefore of an especially simple construction.

The pinion housing may comprise a seating surface on which a lateral face of the stop ring facing the pinion bears, in particular wherein the seating surface is an integral part of a seating shoulder of the pinion housing. This seating surface affords a simple means of positioning the stop ring in the pinion housing. To do this, it is pressed into the housing until it bears on the seating surface. This greatly facilitates the fitting of the stop ring.

According to one design alternative the stop ring has at least one cavity, which is positioned between an outer circumferential surface and an inner circumferential surface of the stop ring, in particular wherein a depth direction of the cavity runs parallel to a ring central axis. Such a cavity serves firstly to save material. As a result, the stop ring is low in weight. Added to this is the fact a stop ring furnished with such a cavity is particularly easy to produce by means of a plastics production process, since the cavity in particular makes it possible to avoid relatively solid portions of the stop ring. Similarly, the stop ring can be designed with substantially uniform wall thicknesses. This serves to prevent the formation of unwanted inclusions and porosity. Furthermore, one or more cavities allow directional adjustment of the elasticity and the rigidity of the stop ring. This applies particularly in an axial direction of the stop ring, that is to say in that direction in which the stop ring limits a rack longitudinal movement, and in a radial direction of the stop ring, that is to say in that direction in which the stop ring limits a tilting of the rack. In this way the limit stops provided by the stop ring can be designed with an adjustable "hardness".

Here the cavity may be axially uninterrupted and therefore in the widest sense designed as a through-hole. Alternatively, the cavity may be axially interrupted and therefore in the widest sense formed as a blind hole. Stop rings according to both alternatives are easy and cost-effective to produce. In particular, the elasticity and rigidity of the stop ring can be purposely influenced by the choice of one of the aforementioned alternatives.

The object is further achieved by a steering gear of the aforementioned type which is equipped with a rack-and-pinion gear according to the present disclosure. The fact that the rack-and-pinion gear according to the present disclosure combines a high reliability with low production costs means that a steering gear equipped with this is also reliable in operation and cost-effective to produce.

The object is further achieved by a steering system for a motor vehicle of the aforementioned type, which comprises a steering gear according to the present disclosure, in particular wherein the steering system is designed as electrically driven power steering. The effects and advantages already described with regard to the steering gear according to the present disclosure also have an effect on the steering system, so that this on the one hand has a high reliability and on the other is cost-effective to produce. In this context steering systems which are designed as electrically driven power-assisted steering are also referred to as electrical power steering (EPS). The steering system here is preferably designed as so-called dual-pinion steering. That is to say the steering wheel acts on the rack via a first pinion and the auxiliary electric motor via a second pinion.

BRIEF DESCRIPTION OF THE DRAWINGS

The present disclosure is explained below with reference to two exemplary embodiments, which are shown in the drawings attached, which show.

DETAILED DESCRIPTION

Figure 1:
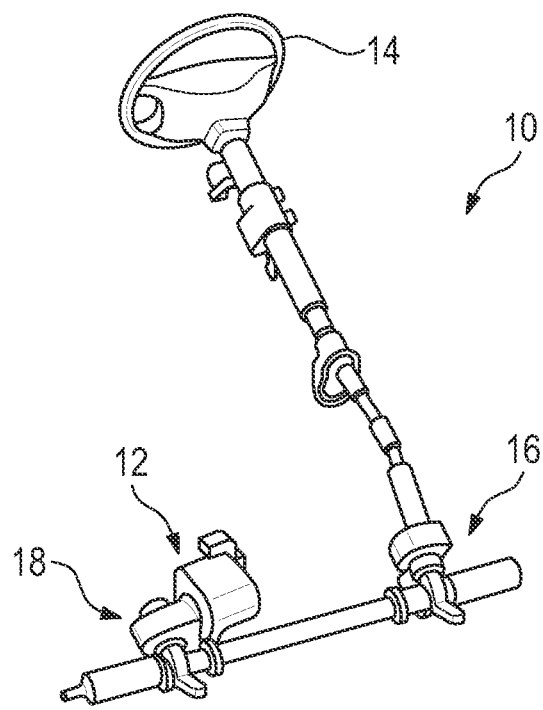
FIG. 1 a steering system according to the present disclosure having a steering gear according to the present disclosure, which comprises a rack-and-pinion gear according to the present disclosure, FIG. 2 the rack-and-pinion gear in FIG. 1 in a sectional representation, FIG. 3 a perspective view of a stop ring of the rack-and-pinion gear in FIG. 2 according to an embodiment slightly modified compared to the variant in FIG. 2 and FIG. 4 a further perspective view of the stop ring in FIG. 3.

FIG. 1 shows a steering system 10 for a motor vehicle, which is designed as electrically driven power steering.

It comprises an electric motor 12, by means of which a steering torque, introduced by a driver via a steering wheel 14, can be assisted or supplemented in such a way that an additional steering force can be exerted on the steered wheels by means of the electric motor 12.

The steering system 10 here comprises two steering gears, wherein a first steering gear 16 serves to transmit a steering torque introduced via the steering wheel 14 to the steered wheels.

A second steering gear 18 serves to transmit the torque generated by the electric motor 12 to the steered wheels.

Both steering gears are designed as rack-and-pinion gears, wherein, however, the respectively associated racks are firmly connected to one another, or only a single rack for is used for both steering gears 16, 18.

Such steering systems are also referred to as dual-pinion steering, since the common rack or the common rack union interacts with two pinions.

Figure 2:
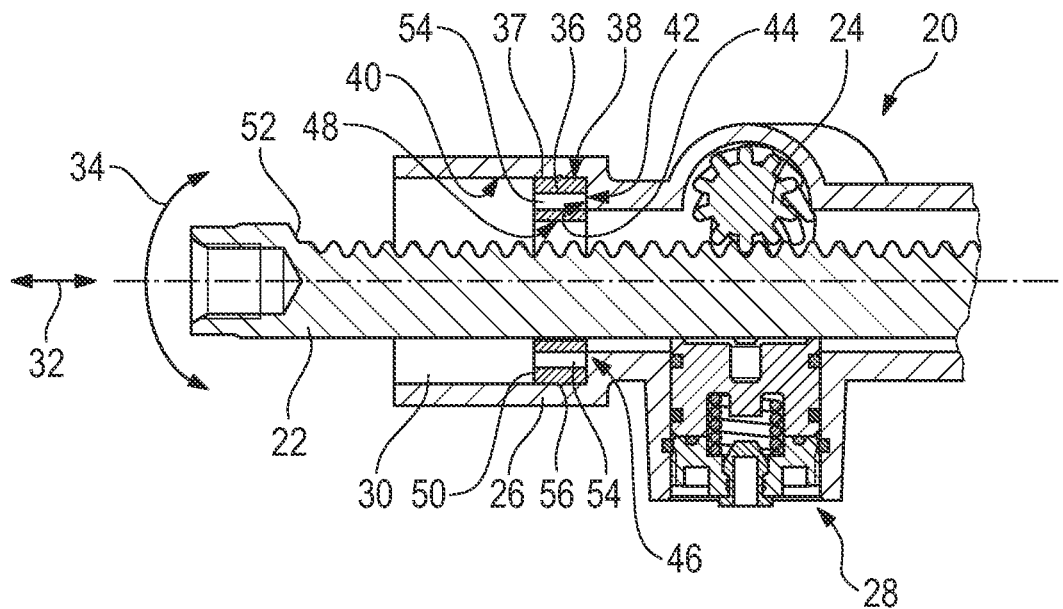

FIG. 2 shows a rack-and-pinion gear 20, which may be both an integral part of the first steering gear 16 and an integral part of the second steering gear 18.

It comprises a rack 22, which meshes with a pinion 24. Here both the rack 22 and the pinion 24 are supported in a so-called pinion housing 26.

In order to ensure a reliable interaction of the rack 22 and the pinion 24, the rack is subjected by means of a yoke 28 to a force in the direction of the pinion 24.

That area in which the rack 22 meshes with the pinion 24 is situated inside the pinion housing 26.

Here however, the rack 22 does not lie entirely inside the pinion housing 26, but projects from the housing through a housing aperture 30.

In order to limit both a rack longitudinal movement, which occurs substantially in a direction illustrated by means of an arrow 32, and a tilting of the rack, which is symbolized by means of an arrow 34, a stop ring 36 is provided in the housing aperture 30.

In this context the tilting of the rack may also be referred to as rack distortion. The two terms are to be interpreted synonymously.

The stop ring 36 is held in the pinion housing 26 by means of a press fit 37.

In the embodiment represented the housing aperture 30 here is of a substantially circular cylindrical design. The press fit 37 therefore exists between an outer circumferential surface 38 of the stop ring 36 and a generated surface 40 the housing aperture 30.

The stop ring furthermore bears, with a lateral face 42 facing the pinion 24, on a seating surface 44 of the pinion housing 26.

The seating surface 44 here is formed as a lateral face of a seating shoulder 46.

Relative to a ring central axis A-A (see FIG. 3 and FIG. 4), the stop ring 36 is therefore positioned in an axial direction in the pinion housing 26 by way of the seating shoulder 46, and the press fit 37 is formed on the circumference of the stop ring 36.

In order to limit the tilting of the rack, an inner circumferential surface 48 of the stop ring 36 comprises a first stop face. In the embodiment represented the entire inner circumferential surface 48 is formed as first stop face.

If the rack 22 is therefore tilted in the direction symbolized by the arrow 34, it strikes against the inner circumferential surface 48, thereby restricting a movement of this nature.

The rack longitudinal movement in the direction indicated by the arrow 32 is limited by means of a lateral face 50 of the stop ring 36 remote from the pinion 24. This lateral face 50 comprises a second stop face. In the embodiment represented the lateral face 50 is formed in its entirety as second stop face. This interacts with a counter-stop face 52 of the rack 22 to limit the rack longitudinal movement.

The stop ring 36 here is produced from a plastic material, a glass fiber-reinforced polyamide being used in the embodiment represented.

An injection molding process is used as the method of manufacture.

The stop ring 36 is not of solid design but comprises cavities 54, which are positioned between the outer circumferential surface 38 and the inner circumferential surface 48.

In this way substantially the same thickness may be selected for all wall thicknesses of the stop ring 36, which counteracts the formation of pores and inclusions in the course of the injection molding process.

A depth direction of the cavities 54 runs in the direction of the ring central axis A-A.

In the embodiment of the stop ring 36 according to FIG. 2 the cavities 54 are axially uninterrupted, forming, as it were, through-holes.

Figure 3:
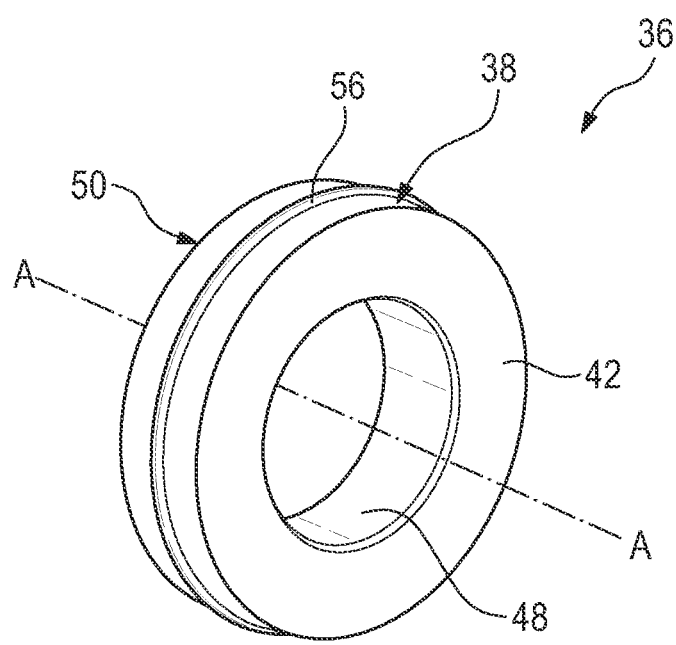
Figure 4:
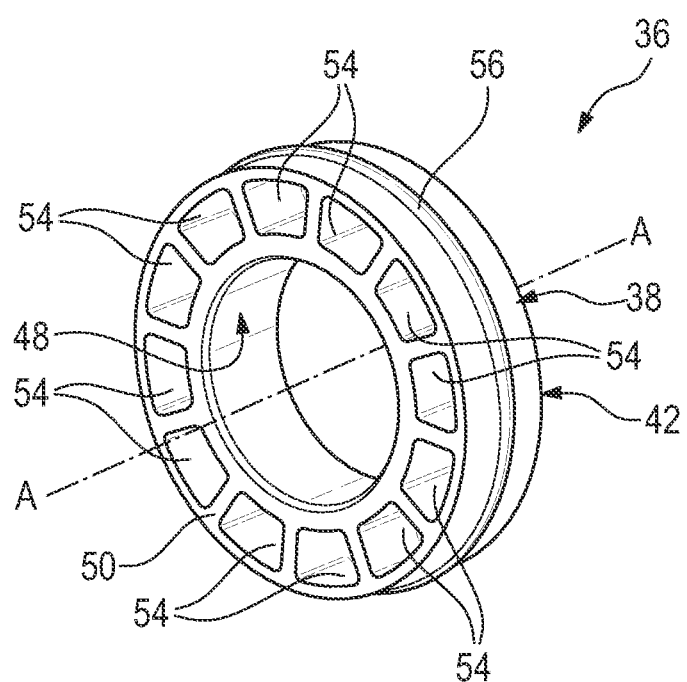

By contrast, the stop ring 36 according to FIGS. 3 and 4 is slightly modified. Here the cavities 54 are no longer axially uninterrupted. They are formed as blind holes.

In both variants represented the stop ring 36 comprises a fully circumferential fixing bead 56 on its outer circumferential surface 38.

This serves to secure the stop ring 36 in the housing aperture 30 and is deformed when pressing the stop ring 36 in.

The pinion housing 26 is produced by means of a casting process. Here it is unmachined in the area of the press fit 37. This means that after casting of the pinion housing 26 no further machining of any kind, in particular no metal cutting, is performed in the area of the press fit 37.

By virtue of the geometry and of the material selected for the stop ring 36, however, this can nevertheless be reliably held in the housing aperture 30.

The rack-and-pinion gear 20 is therefore produced as follows:

First the pinion housing is cast, for example from diecast aluminum.

The stop ring 36 is furthermore produced in an injection molding process.

The stop ring 36 is then pushed or pressed along its ring central axis A-A into the housing aperture 30, until its lateral face 42 bears on the seating shoulder 46. In so doing the fixing bead 56 is deformed.

No machining of the housing aperture 30 is performed after casting.

What is claimed is:

1. A steering gear of a vehicle steering system, the steering gear comprising:
   a pinion housing;
   a rack supported in the pinion housing and projecting from the pinion housing through at least one housing aperture;
   a pinion supported in the pinion housing and meshing with the rack inside the pinion housing; and
   a stop ring in the housing aperture for limiting a rack longitudinal movement and a tilting of the rack, the stop ring comprising a ring body and a fixing bead, the fixing bead extending fully or partially circumferentially on an outer circumferential surface of the ring body, the stop ring being held in the pinion housing only by a press fit engagement between the stop ring and an inner circumferential surface of the housing aperture during use of the steering gear, the fixing bead being retained in a deformed condition by the inner circumferential surface of the housing aperture when the stop ring is press fit in the pinion housing.

2. The steering gear as defined in claim 1 wherein the pinion housing is produced by means of a casting process and is unmachined.

3. The steering gear as defined in claim 2 wherein the inner circumferential surface is unmachined and the press fit is established between the unmachined inner circumferential surface and the stop ring.

4. The steering gear as defined in claim 1 wherein the inner circumferential surface of the housing aperture is free from grooves for receiving the fixing bead.

5. The steering gear as defined in claim 1 wherein the stop ring is produced from a plastic material.

6. The steering gear as defined in claim 1 wherein the ring body comprises at least one cavity positioned between the outer circumferential surface and an inner circumferential surface of the ring body, a depth direction of the cavity extending parallel to a central axis of the stop ring.

7. The steering gear as defined in claim 1 wherein the stop ring is a one-piece construction in which the ring body and the fixing bead are integrally formed together as a single monolithic piece.

8. The steering gear as defined in claim 1 wherein a lateral face of the stop ring is configured to directly engage the rack to limit the longitudinal movement of the rack.

9. The steering gear as defined in claim 8 wherein the ring body is a one-piece construction having the lateral face and a second lateral face opposite the lateral face, the fixing bead being located between the lateral face and the second lateral face.

10. The steering gear as defined in claim 8 wherein the pinion housing comprises a seating surface which a second lateral face of the stop ring directly contacts, the second lateral face facing the pinion and being opposite the lateral face.

11. The steering gear as defined in claim 1, wherein at least a portion of an inner circumferential surface of the stop ring is a first stop face for limiting the tilting of the rack.

12. The steering gear as defined in claim 11, wherein at least a portion of a lateral face of the stop ring remote from the pinion is a second stop face for limiting the rack longitudinal movement.

13. The steering gear as defined in claim 12 wherein the stop ring is produced from a plastic material.

14. The steering gear as defined in claim 1 wherein the pinion housing comprises a seating surface, on which a lateral face of the stop ring facing the pinion bears, wherein the seating surface is an integral part of a seating shoulder of the pinion housing.

15. The steering gear as defined in claim 14 wherein the ring body comprises at least one cavity, which is positioned between the outer circumferential surface and an inner circumferential surface of the ring body, wherein a depth direction of the cavity runs parallel to a central axis of the stop ring.

16. The steering gear as defined in claim 1 wherein an inner circumferential surface of the stop ring supports the rack and retains the rack engaged to the pinion.

17. The steering gear as defined in claim 1 wherein teeth of the rack extend into the stop ring.

* * * * *